(12) United States Patent
Himmel et al.

(10) Patent No.: US 7,024,630 B2
(45) Date of Patent: Apr. 4, 2006

(54) METHOD FOR MANAGING BROWSER DISPLAY

(75) Inventors: Maria Azua Himmel, Yorktown Hts., NY (US); Herman Rodriguez, Austin, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 10/047,248

(22) Filed: Jan. 16, 2002

(65) Prior Publication Data
US 2003/0132958 A1 Jul. 17, 2003

(51) Int. Cl.
*G06F 3/00* (2006.01)

(52) U.S. Cl. .................. 715/747; 715/867; 715/738; 715/760

(58) Field of Classification Search ............... 345/742, 345/743, 745, 760; 715/733, 736, 744, 747, 715/760, 867; 709/223, 224
See application file for complete search history.

(56) References Cited

U.S. PATENT DOCUMENTS

| | | | |
|---|---|---|---|
| 5,796,945 A | 8/1998 | Tarabella | |
| 5,819,284 A | 10/1998 | Farber et al. | |
| 6,009,429 A * | 12/1999 | Greer et al. | 707/10 |
| 6,091,411 A | 7/2000 | Straub et al. | |
| 6,119,098 A | 9/2000 | Guyot et al. | |
| 6,181,838 B1 | 1/2001 | Knowlton | |
| 6,202,083 B1 | 3/2001 | Chrabaszcz | |
| 6,216,141 B1 | 4/2001 | Straub et al. | |
| 6,323,881 B1 * | 11/2001 | Broulik et al. | 345/744 |
| 6,463,474 B1 * | 10/2002 | Fuh et al. | 709/225 |
| 6,567,103 B1 * | 5/2003 | Chaudhry | 345/738 |
| 6,571,256 B1 * | 5/2003 | Dorian et al. | 707/104.1 |
| 6,763,379 B1 * | 7/2004 | Shuster | 709/224 |
| 6,772,146 B1 * | 8/2004 | Khemlani et al. | 707/3 |
| 2003/0018887 A1 * | 1/2003 | Fishman et al. | 713/151 |
| 2003/0051129 A1 * | 3/2003 | Razdan et al. | 713/151 |

OTHER PUBLICATIONS

PlusPat File Abstracts (2).

* cited by examiner

*Primary Examiner*—Kieu D. Vu
(74) *Attorney, Agent, or Firm*—Mark S. Walker

(57) ABSTRACT

A system, method, and computer program product are designed to manage web content displayed at a client device during one or more browser sessions. Responsive to a request for a first web page, the first web page is displayed at the client device through the browser session. A timeout condition at the browser is detected and a second predetermined web page is displayed at the client device, replacing the first web page, and optionally also clearing cache memory.

14 Claims, 4 Drawing Sheets

METHOD FOR MANAGING BROWSER DISPLAY

TECHNICAL FIELD

The present invention relates to a method, system, and computer program product for managing the display of web content at a client browser. More particularly, the invention relates to a method, system, and computer program product for replacing web content which is currently displayed to a client system upon detection of a timeout condition in a browser session.

BACKGROUND OF THE INVENTION

The Internet is a set of computer networks, possibly dissimilar, joined together by means of gateways that handle data transfer and the conversion of messages from protocols of the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society, such as the Internal Revenue Service and Secretaries of State. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g. text, still graphic images, audio, motion video). The information in various data files is formatted for presentation to a user by means of a standard page description languages such as the Hypertext Markup Language (HTML) and extensible markup language (XML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

When a user enters a domain name through a GUI for a browser to access a source of content and navigates through the content using mouse, keyboard, or other suitable inputs, such as voice and tactile input. Currently most non-secure browser sessions monitor for inputs to the displayed page and subsequently timeout when a predefined period of "no inputs", or "inactivity" is reached. Upon reaching a timeout condition, the website may revert to a default page or simply lock on the last displayed page, disallowing any further activity without the reentry of a username and/or password. However, these sites do not provide a means for a user to specify what web page is displayed after a timeout condition is reached. In addition, some sites leave the last viewed page displayed regardless of the sensitivity of the information on the page. Therefore, it would be desirable to have a browser feature that replaces a currently displayed window upon detecting a period of inactivity such that the original web page is no longer displayed. The new web page would then protect the user's confidential or otherwise sensitive information previously displayed.

SUMMARY OF THE INVENTION

The present invention provides a system, method, and computer program product designed to manage web content displayed at a client device during one or more browser sessions. Responsive to a request for a first web page, the first web page is displayed at the client device through the browser session. A timeout condition at the browser is detected and a second predetermined web page is displayed at the client device, replacing the first web page. In a preferred embodiment, the cache memory associated with the browser session is also cleared, further removing traces of any private and/or confidential information the user may have viewed.

One aspect of the present invention monitors browser activity such that a user's private and/or confidential information may be removed from view should the user forget to clear the screen before leaving the workstation.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
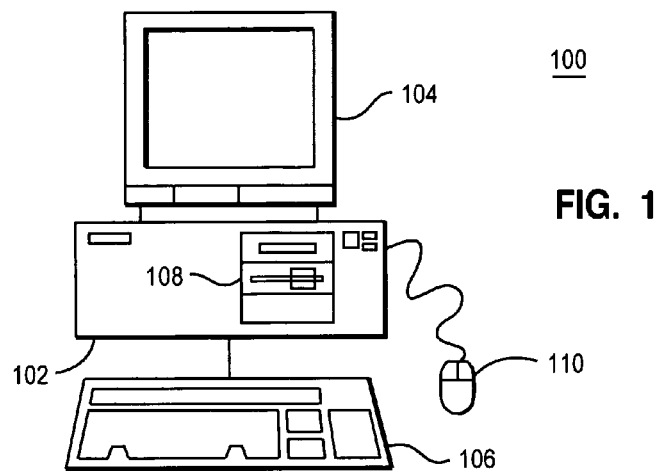
FIG. 1 is an example of a client-server data processing system suitable for use in the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, video display terminal 104, keyboard 106, storage devices 108, which may include floppy drives and other types of permanent and removable storage media, and mouse 110. Additional input devices may be included with personal computer 100, such as, for example, a joystick, touch pad, touch screen, trackball, microphone, and the like. Computer 100 can be implemented using any suitable computer. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
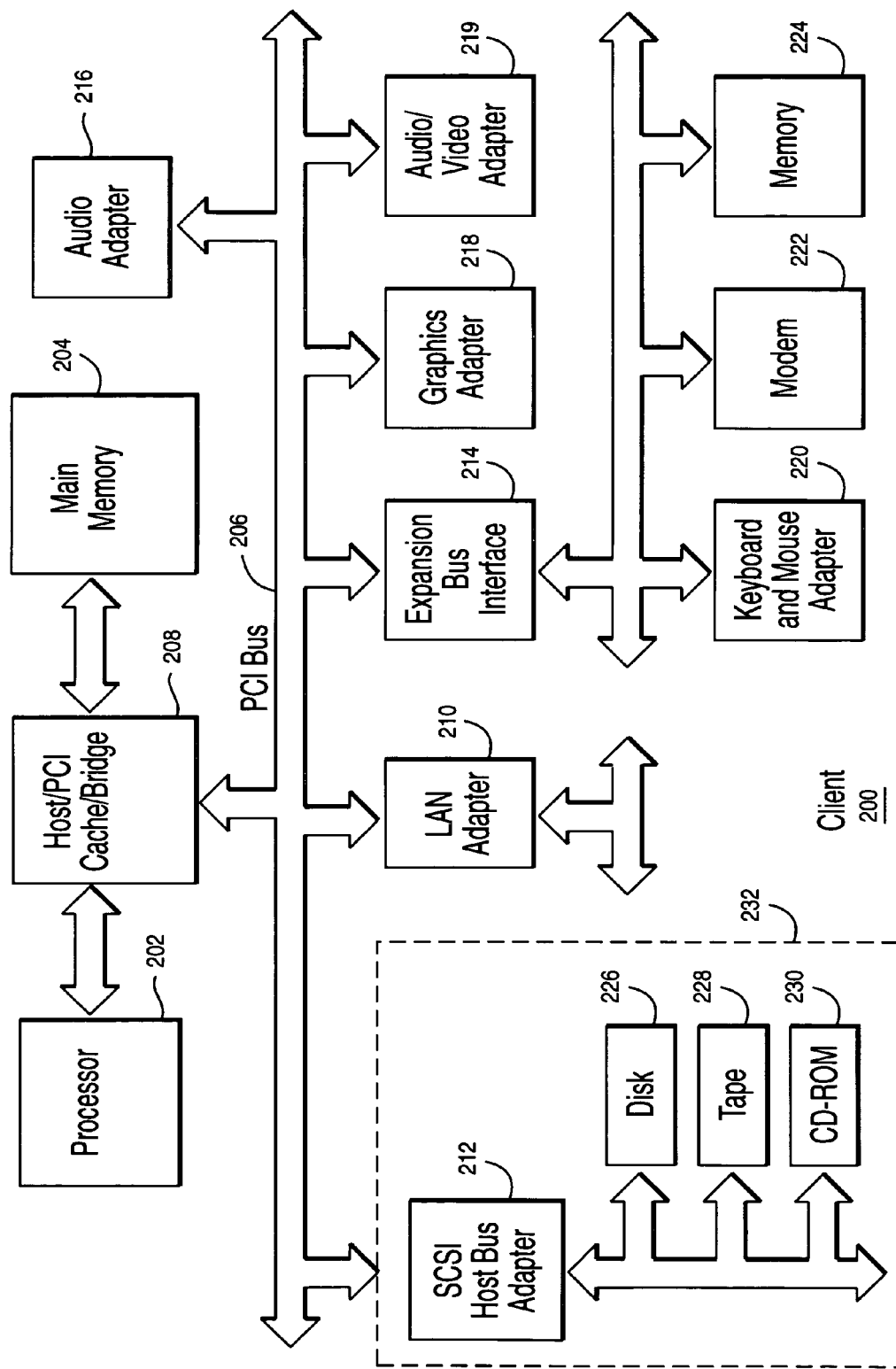
FIG. 2 is a block diagram of components found on an exemplary client in accordance with the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming environment such as Java may run in conjunction with the operating system and provides calls to the operating system from Java programs or applications executing on data processing system 200. "Java" is a trademark of Sun Microsystems, Inc. Instructions for the operating system, the object-oriented programming environment, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying upon some type of network communication interface, whether or not data processing system 200 comprises some type of network communication interface. As a further example, data processing system 200 may be a personal digital assistant (PDA), which is configured with ROM and/or flash ROM to provide nonvolatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

Figure 3:
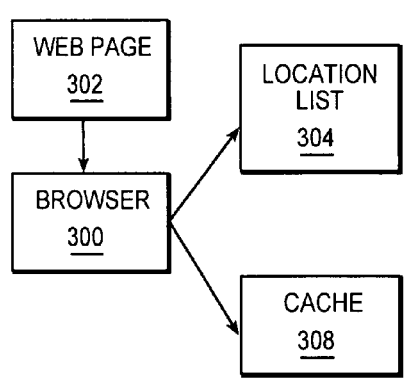
FIG. 3 is a schematic diagram of a client computer system suitable for use in the present invention.

With reference now to FIG. 3, a diagram illustrating components used in managing the display of web content at a browser is depicted in accordance with a preferred embodiment of the present invention. Browser 300 is an example of a browser, which may be executing on data processing system 200 in FIG. 2.

In this example, browser 300 receives Web page 302 for presentation. Web page 302 may be obtained by entering a URL. This URL may be stored in location list 304. Location list 304 contains URLs entered by the user. These URLs are typically entered through a field, which is often called an "address bar". Cache 308 provides for temporary storage of Web pages received by the browser. For example, images and text for Web page 302 may be stored in cache 308. Cache 308 provides a quick way to redisplay Web page 302 if the user later returns to Web page 302.

The present invention provides a method, apparatus, and computer implemented instructions for monitoring browser activity. The mechanism of the present invention monitors activity or inactivity for a given web page displayed during a browser session using browser 300. Inactivity is measured from a point in time when no user input is received by the browser. User input may come in many forms including but not limited to mouse, keyboard, audio, and tactile inputs. Once a given browser session has been inactive for a predefined period of time, the browser automatically fetches another web page, replacing the previously displayed page and optionally clearing the cache 308. Additionally, the mechanism of the present invention provides a graphical user interface for users to configure the browser to monitor session activity, define "period of inactivity", and designate replacement pages when the predefined period of inactivity is exceeded. This interface provides the user with the option of monitoring individual browser sessions, such as when more than one browser session is open, or use the same settings for all browser sessions.

Figure 4:
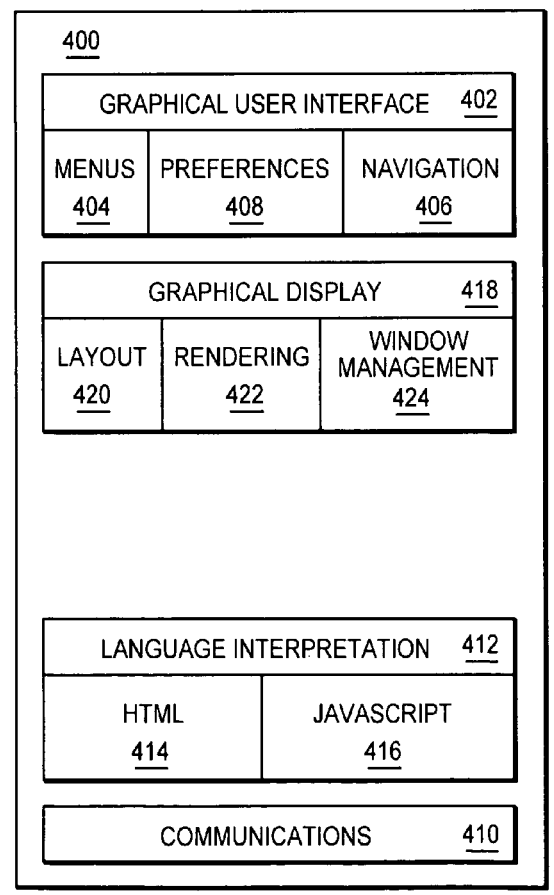
FIG. 4 is flow diagram of a process for creating a master input file in accordance with the present invention.

Turning next to FIG. 4, a block diagram of a browser program is depicted in accordance with a preferred embodiment of the present invention. A browser is an application used to navigate or view information or data in a distributed database, such as the Internet or the World Wide Web. In particular, processes may be included within browser 400 to monitor browser session activity.

In this example, browser 400 includes a user interface 402, which is a graphical user interface (GUI) that allows the user to interface or communicate with browser 400. This interface provides for selection of various functions through menus 404 and allows for navigation through navigation 406. For example, menu 404 may allow a user to perform various functions, such as saving a file, opening a new window, displaying a history, and entering a URL. Navigation 406 allows for a user to navigate various pages and to select web sites for viewing. For example, navigation 406 may allow a user to see a previous page or a subsequent page relative to the present page. Additionally, menu 404 may allow a user to initiate an activity monitor for one or more active browser sessions. Preferences such as those illustrated in FIG. 4 may be set through preferences 408.

Communications 410 is the mechanism with which browser 400 receives documents and other resources from a network such as the Internet. Further, communications 410 is used to send or upload documents and resources onto a network. In the depicted example, communication 410 uses HTTP. Other protocols may be used depending on the implementation. Documents that are received by browser 400 are processed by language interpretation 412, which includes HTML unit 414 and JavaScript unit 416. Language interpretation 412 will process a document for presentation on graphical display 418. In particular, HTML statements are processed by HTML unit 414 for presentation, while JavaScript statements are processed by JavaScript unit 416.

Graphical display 418 includes layout unit 420, rendering unit 422, and window management 424. These units are involved in presenting Web pages to a user based on results from language interpretation 412.

Browser 400 is presented as an example of a browser program in which the present invention may be embodied. Browser 400 is not meant to imply architectural limitations to the present invention. Presently available browsers may include additional functions not shown or may omit functions shown in browser 400. A browser may be any application that is used to search for and display content on a distributed data processing system. Browser 400 may be implemented using know browser applications, such Netscape Navigator or Microsoft Internet Explorer. Netscape Navigator is available from Netscape Communications Corporation, while Microsoft Internet Explorer is available from Microsoft Corporation.

Figure 5:
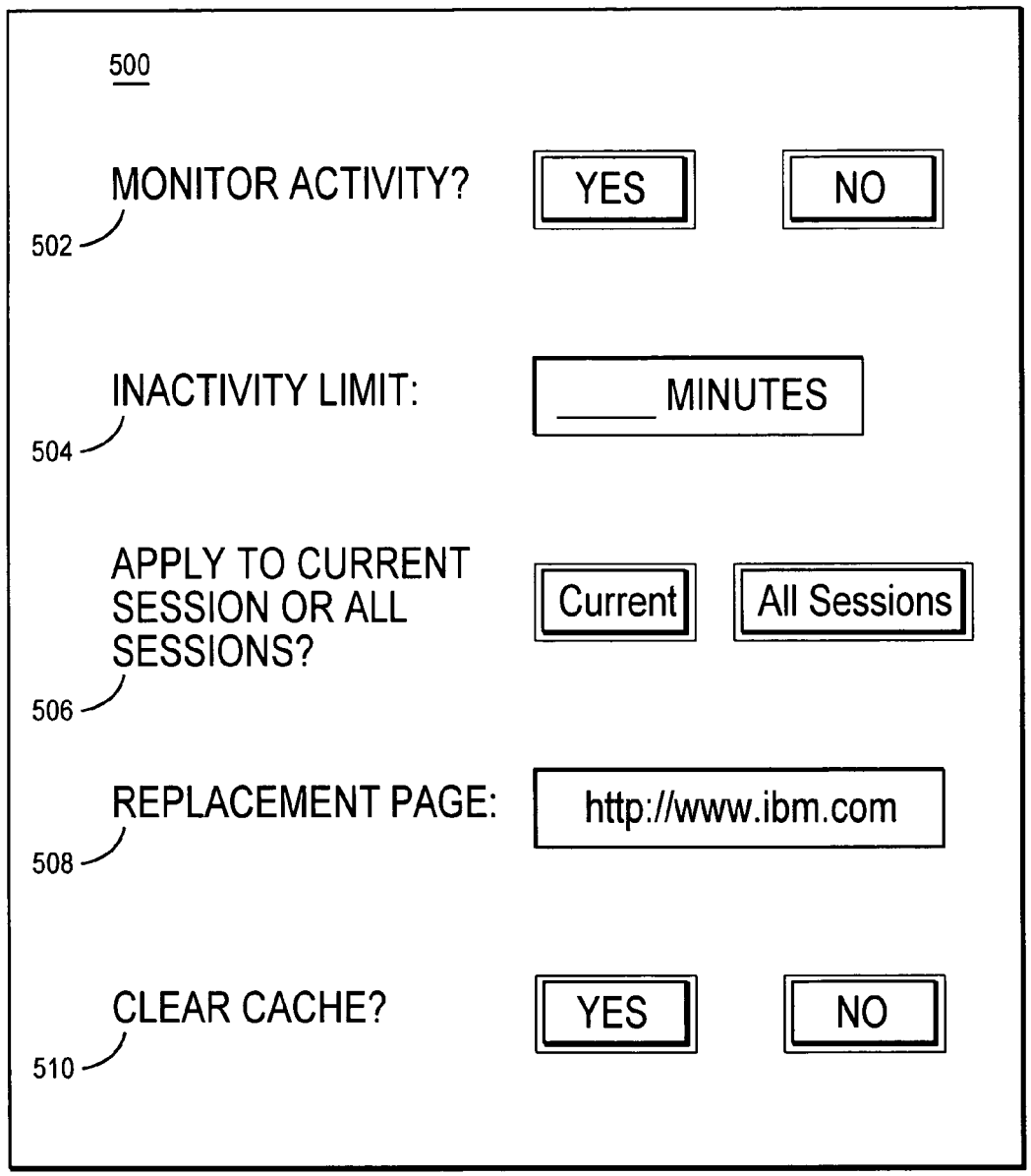
FIG. 5 is a block diagram of a graphical user interface for creating custom preference files on a client in accordance with one embodiment of the present invention.

Turning next to FIG. 5, a block diagram of an exemplary graphical user interface used to enter the parameters for monitoring browser session activity is depicted in accordance with one embodiment of the present invention. Graphical user interface 500 may be implemented in browser 400 in FIG. 4.

In this example, interface 500 is shown in the form of a window that can come up when the browser is first initiated or separately activated from a menu or tool bar option. The interface 500 prompts the user to input the required information to configure the browser for monitoring browser session activity. The first input 502 is whether the user wants to monitor activity. Assuming the user selects "Yes", the second input 504 is the time limit of inactivity that will trigger a timeout condition. The user may enter any amount of time for this parameter. The next input 506 is whether the user wants these settings to apply to all browser sessions or only the current session. If "Current" is selected then only the currently displayed browser session is monitored. If "All Sessions" is selected then all subsequent browser session activity will be monitored for the same period of time, measuring from a point where no activity is detected in each individual browser session. Input 508 is the address for the replacement page. Users may enter any URL they choose to replace the current web page in the browser session once a timeout condition is reached. Input 510 is whether the user wants to clear cache memory files associated with browser sessions. Advantageously, users may protect private and/or confidential information from being viewed on the client inadvertently.

The interface 500 is described in the form of a window that opens when the browser session is initiated or based on user preferences. While this is one example of how the present invention may be implemented, it will be clear to one of ordinary skill in the art that there are several ways to implement the mechanism of the present invention without departing from the spirit of the invention. For example, these processes may be implemented as a plug-in or as a separate application.

Figure 6:
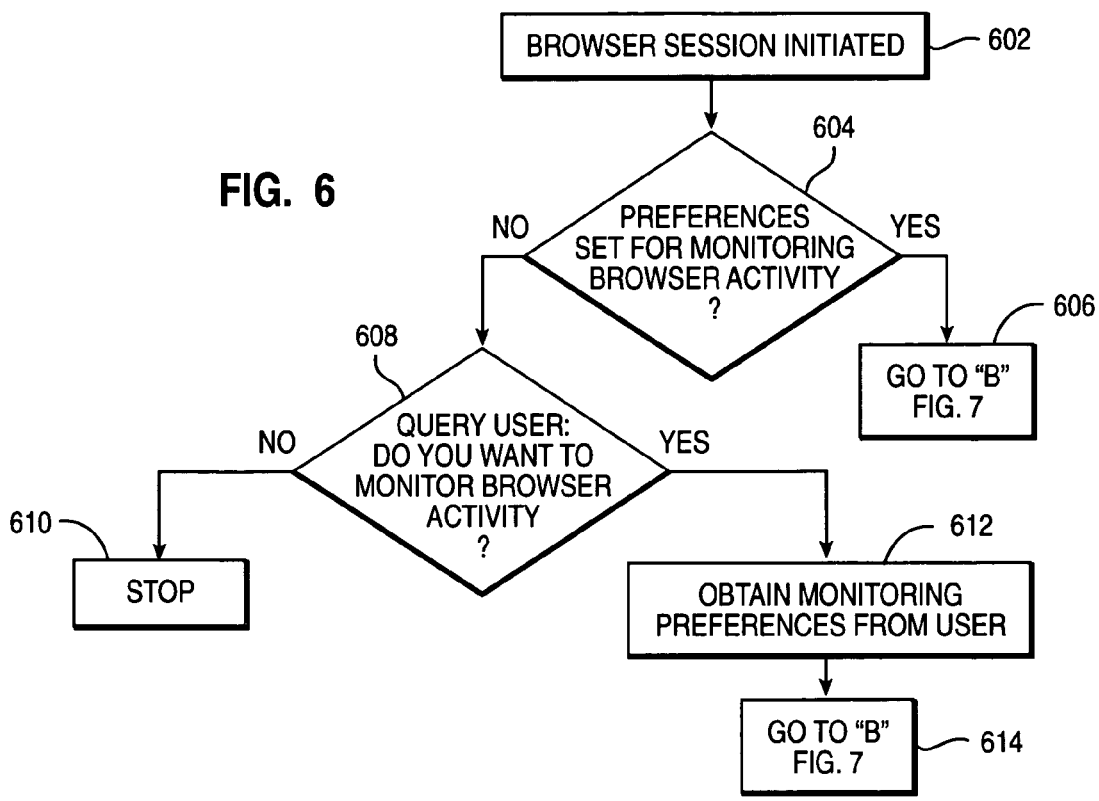
FIG. 6 is a flow diagram of a process for monitoring browser session activity in accordance with the present invention.

FIG. 6 is a flow diagram of an exemplary process for monitoring browser session activity in accordance with one embodiment of the present invention. A browser session is activated at step 602. The browser checks for preferences indicating that the browser activity should be monitored, step 604. In this example, the browser may be pre-configured to monitor activity or configured each time the browser is initiated. If user preferences are set for monitoring, then the process goes to "B" (see FIG. 7), step 606. If there are no preferences already set, then the process goes to step 608, where users are asked if they want to monitor the activity of the current browser session. If the answer is no, they do not want to monitor activity, then the process stops, step 610. If they do want to monitor activity, then the monitoring preferences are obtained at step 612. The process then goes to "B" in FIG. 7, step 614.

Figure 7:
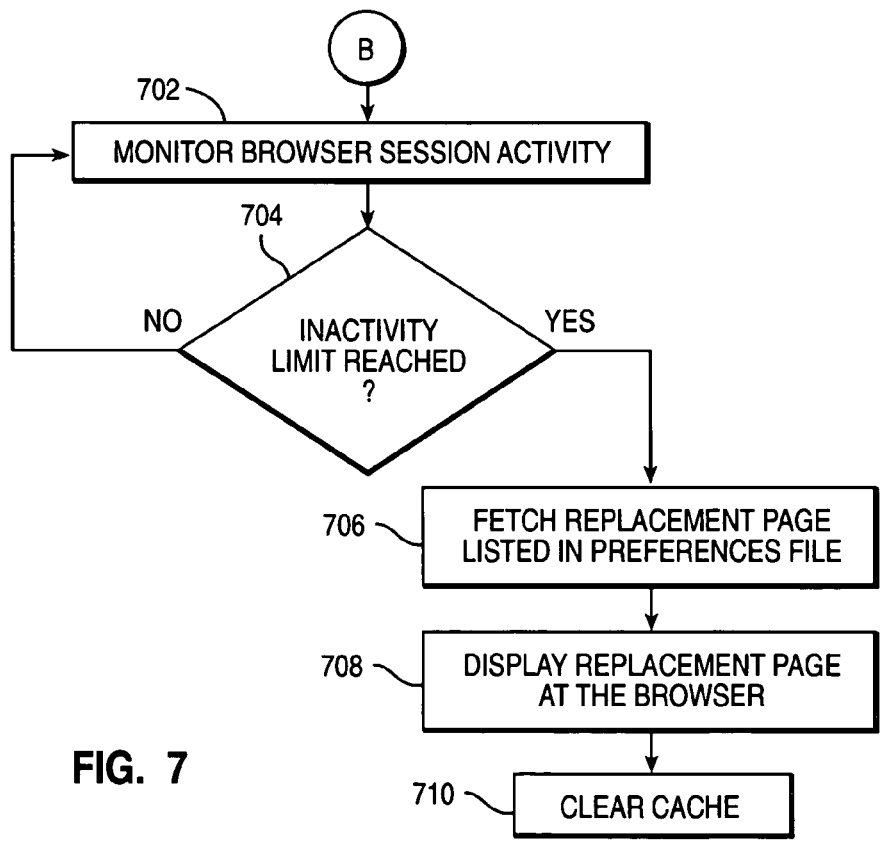
FIG. 7 is a flow diagram of a process for monitoring browser session activity in accordance with a preferred embodiment of the present invention.

FIG. 7 is a flow diagram of an exemplary process for monitoring browser session activity in accordance with one embodiment of the present invention continuing from various points in the process outlined in FIG. 6, above. From step 606 and 614 where the preferences are set for monitoring the browser, the browser session activity is monitored, step 702. The process determines whether the inactivity limit, as predefined, has been reached, step 704. If the inactivity limit has not been reached, then the process goes back to step 702. If the inactivity limit has been reached, then a timeout condition is declared and the replacement page listed in the preferences file is fetched, step 706. The replacement page is then displayed in the browser session having a timeout condition, step 708. At this point, the process may continue on to monitor browser activity or it may end, the result would be the same, the process would simply replace the existing web page with the same web page as in step 708. Regardless, the ultimate result of maintaining privacy for the user is achieved in that once a timeout condition is reached, the content displayed at the browser is a page that is pre-defined by the user.

In an alternate embodiment, the browser may clear the cache memory file associated with the inactive browser session, step 710. This step will remove the evidence of pages visited by the user from the cache and further protect the user's private and/or confidential information from being viewed by prying eyes.

Thus, the present invention provides an improved method, system, and computer implemented instructions for managing the display of web content using a browser. This advantage may be implemented through a graphical user interface for providing user input to define an inactivity limit or timeout condition for a given browser session and what page to replace the displayed page with once the inactivity limit is reached.

While the invention has been shown and described with reference to particular embodiments thereof, it will be understood by those skilled in the art that the foregoing and other changes in form and detail may be made therein without departing from the spirit and scope of the invention.

We claim:

1. A method for managing web content displayed at a client device during one or more browser sessions comprising:
   providing a browser for displaying web pages;
   responsive to a request for a first web page, displaying the first web page at the client device through a browser session;
   receiving user input through a client device interface specifying a period of time used to define a timeout condition of the browser session of said client device;
   receiving user input through said client device interface specifying a URL address of a second web page;
   detecting the timeout condition in the browser session;
   automatically fetching and displaying the second web page of specified URL address to replace the first web page in response to said detecting the timeout condition in the browser session;
   wherein said client device interface further provides user an option to clear a local cache memory file included in the client device in response to detecting the timeout condition in the browser session wherein said local cache memory file is associated with the browser session.

2. The method of claim 1, further comprising clearing the local cache memory file associated with the browser session in response to said detecting the timeout condition in the browser session if the user has selected the option to clear the local cache memory file in response to said detecting the time out condition.

3. The method of claim 1 wherein multiple browser sessions are concurrently active on the client device, further comprising monitoring the multiple browser sessions and responsive to detecting the timeout condition at any one of the browser sessions, displaying the second web page at each of said browser sessions having the timeout condition.

4. The method of claim 1 further comprising monitoring activity in the one or more browser sessions.

5. The method of claim 1 wherein the period of time is measured from a point of inactivity in the browser session.

6. A system for managing web content displayed at a client device during at least one browser session comprising:
   a processor;
   a memory coupled to the processor;
   a computer readable medium coupled to the processor containing instructions for:
   providing a browser for displaying web pages;
   displaying a first web page at the client device through an active browser session in response to a request for the first web page;
   receiving user input through a client device interface specifying a period of time used to define a timeout condition of the browser session of said client device;
   receiving user input through said client device interface specifying a URL address of a second web page;
   detecting the timeout condition in the browser session;
   automatically fetching and displaying the second web page of specified URL address to replace the first web page in response to said detecting the timeout condition in the browser session;
   wherein said client device interface further provides user an option to clear a local cache memory file included in the client device in response to detecting the timeout condition in the browser session wherein said local cache memory file is associated with the browser session.

7. The system of claim 6, further comprising instructions for clearing the local cache memory file associated with the browser session in response to said detecting the timeout condition in the browser session if the user has selected the option to clear the local cache memory file in response to said detecting the timeout condition.

8. The system of claim 6 wherein multiple browser sessions are concurrently active on the client device, further comprising instructions for monitoring the multiple browser sessions and responsive to detecting the timeout condition at any one of the browser sessions, instructions for displaying the second web page at each of said browser sessions having the timeout condition.

9. The system of claim 6 further comprising instructions for monitoring activity in the at least one browser session.

10. The system of claim 6 wherein the period of time is measured from a point of inactivity in the browser session.

11. A computer program product for managing web content displayed at a client device during at least one browser session comprising:
    a recording medium;
    means, recorded on the medium, for providing a browser for displaying web pages;
    means, recorded on the recording medium, for responsive to a request for a first web page, displaying the first web page at the client device through an active browser session;
    means, recorded on the recording medium, for receiving user input through a client device interface specifying a period of time used to define a timeout condition of the browser session of said client device;
    means, recorded on the recording medium, for receiving user input through said client device interface specifying a URL address of a second web page;
    means, recorded on the recording medium, for detecting the timeout condition in the browser session;
    means, recorded on the recording medium, for automatically fetching and displaying the second web page of specified URL address to replace the first web page in response to said detecting the timeout condition in the browser session;
    wherein said client device interface further provides user an option to clear a local cache memory file included in the client device in response to detecting the timeout condition in the browser session wherein said local cache memory file is associated with the browser session.

12. The computer program product of claim 11, further comprising means, recorded on the recording medium, for clearing the local cache memory file associated with the browser session in response to said detecting the timeout condition in the browser session if the user has selected the option to clear the local cache memory file in response to said detecting the timeout condition.

13. The computer program product of claim 11, further comprising means, recorded on the recording medium, for monitoring more than one browser session and responsive to detecting the timeout condition at any one of the browser sessions, means for displaying the second web page at each of said browser sessions having the timeout condition.

14. The computer program product of claim 11 further comprising means, recorded on the recording medium, for monitoring activity in the at least one browser session.

* * * * *